US008813073B2

(12) United States Patent
Kwon et al.

(10) Patent No.: US 8,813,073 B2
(45) Date of Patent: Aug. 19, 2014

(54) COMPILING APPARATUS AND METHOD OF A MULTICORE DEVICE

(75) Inventors: Ki-Seok Kwon, Seoul (KR); Suk-Jin Kim, Seoul (KR); Scott Mahlke, Ann Arbor, MI (US); Yong-Jun Park, Ann Arbor, MI (US)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 13/116,601

(22) Filed: May 26, 2011

(65) Prior Publication Data

US 2012/0159507 A1 Jun. 21, 2012

(30) Foreign Application Priority Data

Dec. 17, 2010 (KR) .................. 10-2010-0130254

(51) Int. Cl.
*G06F 9/455* (2006.01)
*G06F 9/46* (2006.01)

(52) U.S. Cl.
USPC .............................................. 718/1; 718/102

(58) Field of Classification Search
None
See application file for complete search history.

(56) References Cited

U.S. PATENT DOCUMENTS

| | | | |
|---|---|---|---|
| 5,031,089 A | 7/1991 | Liu et al. | |
| 6,092,097 A | 7/2000 | Suzuoka | |
| 6,195,676 B1 | 2/2001 | Spix et al. | |
| 6,339,819 B1 | 1/2002 | Huppenthal et al. | |
| 7,152,170 B2 | 12/2006 | Park | |
| 7,437,581 B2 | 10/2008 | Grochowski et al. | |
| 7,487,496 B2 | 2/2009 | O'Brien et al. | |
| 7,503,039 B2 | 3/2009 | Inoue et al. | |
| 7,617,383 B2 | 11/2009 | Moore et al. | |
| 7,620,800 B2 | 11/2009 | Huppenthal et al. | |
| 7,739,667 B2 | 6/2010 | Callahan, II et al. | |
| 7,752,422 B2 | 7/2010 | Moore | |
| 2003/0212731 A1 | 11/2003 | Brenner et al. | |
| 2006/0123401 A1 | 6/2006 | O'Brien et al. | |
| 2007/0038987 A1* | 2/2007 | Ohara et al. | 717/151 |
| 2007/0192504 A1 | 8/2007 | Moore | |
| 2007/0192566 A1 | 8/2007 | Moore et al. | |
| 2007/0192575 A1 | 8/2007 | Moore et al. | |

(Continued)

FOREIGN PATENT DOCUMENTS

KR 10-2005-0092231 9/2005
KR 10-2007-0049226 A 5/2007

(Continued)

OTHER PUBLICATIONS

European Search Report issued Aug. 3, 2011, in counterpart European Patent Application No. 11165386.1 (7 pages, in English).

(Continued)

*Primary Examiner* — Kenneth Tang
(74) *Attorney, Agent, or Firm* — NSIP Law

(57) ABSTRACT

An apparatus and method capable of reducing idle resources in a multicore device and improving the use of available resources in the multicore device are provided. The apparatus includes a static scheduling unit configured to generate one or more task groups, and to allocate the task groups to virtual cores by dividing or combining the tasks included in the task groups based on the execution time estimates of the task groups. The apparatus also includes a dynamic scheduling unit configured to map the virtual cores to physical cores.

15 Claims, 20 Drawing Sheets

(56) References Cited

U.S. PATENT DOCUMENTS

| | | |
|---|---|---|
| 2007/0192646 A1 | 8/2007 | Moore |
| 2007/0226457 A1 | 9/2007 | Moore et al. |
| 2007/0250682 A1 | 10/2007 | Moore et al. |
| 2008/0028057 A1 | 1/2008 | Reason et al. |
| 2008/0140980 A1 | 6/2008 | Mei et al. |
| 2009/0077545 A1 | 3/2009 | Silvera et al. |
| 2009/0259828 A1 | 10/2009 | Grover et al. |
| 2009/0259829 A1 | 10/2009 | Grover et al. |
| 2009/0259832 A1 | 10/2009 | Grover et al. |
| 2009/0259996 A1 | 10/2009 | Grover et al. |
| 2009/0259997 A1 | 10/2009 | Grover et al. |
| 2010/0082938 A1 | 4/2010 | Duvalsaint et al. |
| 2010/0153700 A1 | 6/2010 | Capps, Jr. et al. |
| 2010/0281238 A1 | 11/2010 | Moore |
| 2012/0084777 A1* | 4/2012 | Jayamohan ........................ 718/1 |

FOREIGN PATENT DOCUMENTS

| | | |
|---|---|---|
| KR | 10-2007-0098760 | 10/2007 |
| KR | 10-2008-0010363 B | 1/2008 |
| KR | 10-2008-0025053 C | 3/2008 |
| KR | 10-2008-0076392 | 8/2008 |
| KR | 10-2009-0107973 | 10/2009 |
| KR | 10-2010-0069551 D | 6/2010 |
| KR | 10-2010-0074920 | 7/2010 |
| WO | WO 2007/128168 | 11/2007 |

OTHER PUBLICATIONS

Orlando, Salvatore, et al., "A Template for Non-uniform parallel Loops Based on Dynamic Scheduling and Prefetching Techniques," Proceedings of the 1996 International Conference on Supercomputing, May 25, 1996, pp. 117-124, Vol. Conf. 10, New York, US.

* cited by examiner

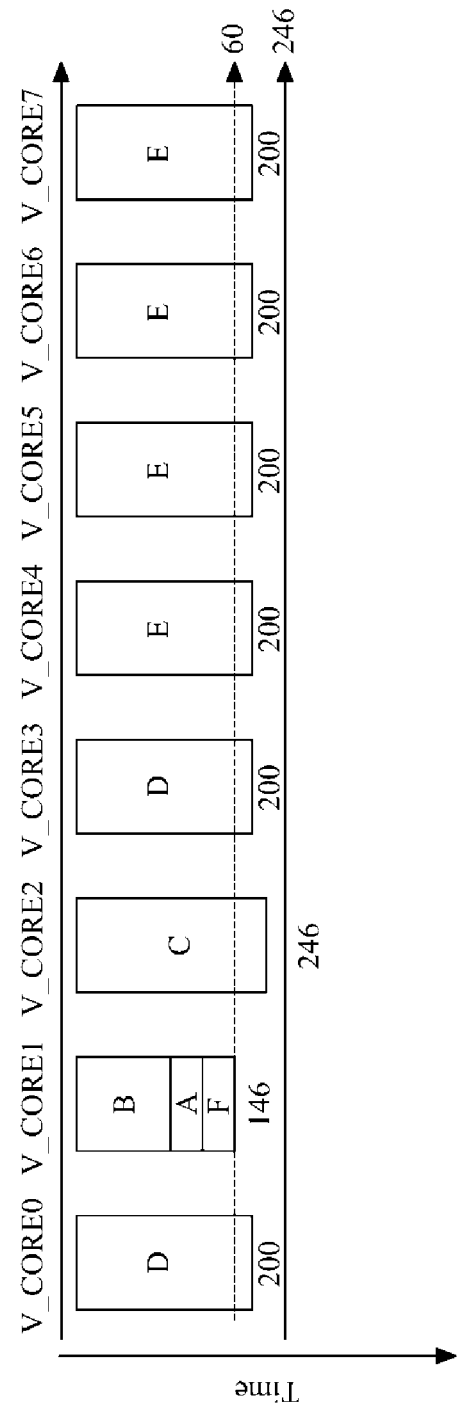

| Task | Task Group | Virtual Core |
|------|------------|--------------|
| A, B, F | BAF | 1 |
| C | C | 2 |
| D | D | 0, 3 |
| E | E | 4, 5, 6, 7 |

COMPILING APPARATUS AND METHOD OF A MULTICORE DEVICE

CROSS-REFERENCE TO RELATED APPLICATION(S)

This application claims the benefit under 35 U.S.C. §119(a) of Korean Patent Application No. 10-2010-0130254, filed on Dec. 17, 2010, in the Korean Intellectual Property Office, the entire disclosure of which is incorporated herein by reference for all purposes.

BACKGROUND

1. Field

The following description relates to compiling and scheduling techniques for a multicore device.

2. Description of the Related Art

Multicore devices include processors equipped with two or more processing cores that are capable of processing multiple tasks at the same time. Multicore processors are typically more efficient than single-core processors in terms of performance and power consumption, and as a result they have attracted an increasing amount of attention.

Multicore devices are classified into a symmetric multiprocessing (SMP) device that is equipped with multiple homogeneous cores and an asymmetric multiprocessing (AMP) device that is equipped with a variety of heterogeneous cores that can be used as digital processing processors (DSPs), graphic processing units (GPUs) or general purpose processors (GPPs).

Each processing core in a multicore system executes tasks independently. Accordingly, some processing cores in a multicore system may become idle. For example, there may be some cores that stop executing tasks and that are on stand-by until other processing cores finish their tasks. Cores that are idle without executing tasks are referred to as idle cores. These idle cores lead to a waste of system resources.

SUMMARY

In one general aspect, there is provided a compiling apparatus including a static scheduling unit configured to generate a plurality of task groups that each comprise at least one task, and to allocate the plurality of task groups to virtual cores by dividing or combining the tasks included in the plurality of task groups based on execution time estimates of the plurality of task groups, and a dynamic scheduling unit configured to map the virtual cores to physical cores, wherein the dynamic scheduling unit reallocates a part of a task group with a highest execution time estimate allocated to a first physical core to a second physical core which is connected to the first physical core and to which a task group with a lowest execution time estimate is allocated.

The static scheduling unit may calculate the execution time estimates of the plurality of task groups based on a number of virtual cores to execute each of the task groups, and regenerate the plurality of task groups by dividing or combining the tasks included in the plurality of task groups based on the results of the calculation.

The static scheduling unit may detect the task group with the highest execution time estimate and the task group with the lowest execution time estimate, and continue to regenerate the plurality of task groups by dividing or combining the tasks included in the plurality of task groups until a difference between the highest execution time estimate and the lowest execution time estimate is less than a predetermined threshold value.

If the difference is not less than the threshold value, the static scheduling unit may increase a number of virtual cores that are allocated to the task group with the highest execution time estimate.

If the difference is not less than the threshold value, the static scheduling unit may merge the task group with the lowest execution time estimate with another task group.

The static scheduling unit may comprise a task classifier configured to classify the tasks into big tasks and small tasks based on execution time estimates of the plurality of tasks, a big task allocator configured to generate the plurality of task groups, to calculate execution time estimates of the plurality of task groups based on a number of virtual cores to be allocated to each of the plurality of task groups, to reallocate the plurality of task groups by dividing or combining the big tasks included in the plurality of task groups based on the execution time estimates of the plurality of task groups, and to allocate the plurality of task groups to the virtual cores, and a small task allocator configured to detect a main task of small tasks from among the big tasks, and to allocate the small tasks to a virtual core to which the detected main task is allocated so that the small tasks are executed when non-cyclic codes of the detected main task are executed.

The dynamic scheduling unit may map a first virtual core to which the task group with the highest execution time estimate is allocated to the first physical core and map a second virtual core to which the task group with the lowest execution time estimate is allocated to the second physical core, which is connected to the first physical core.

The dynamic scheduling unit may detect a resource-restrained portion from the task group with the highest execution time and estimate and reallocate the detected resource-restrained portion to the second physical core in consideration of an execution time estimate of each physical core.

The compiling apparatus may further comprise a task phase matching unit configured to detect a preceding task and a group of subsequent tasks having a parallel relationship therebetween from a data flow graph, wherein, if one of the subsequent tasks is allocated to a different physical core from the preceding task, the task phase matching unit may match pipeline stages of the subsequent tasks such that the subsequent tasks are executed at the same pipeline stage.

The task phase matching unit may delay the pipeline stage of a subsequent task that is allocated to the same physical core as the preceding task such that the subsequent tasks is executed at the same pipeline stage.

In another aspect, there is provided a compiling method including generating a plurality of task groups that each include at least one task, allocating the generated task groups to virtual cores by dividing or combining the tasks included in the plurality of task groups based on execution time estimates of the plurality of task groups, and mapping the virtual cores to the physical cores and reallocating part of a task group with a highest execution time estimate allocated to a first physical core to a second physical core that is allocated a task group with a lowest execution time estimate.

The compiling method may further comprise detecting a preceding task and a group of subsequent tasks that have a parallel relationship therebetween from a data flow graph, and in response to one of the subsequent tasks being allocated to a different physical core from the preceding task, matching pipeline stages of the subsequent tasks such that the subsequent tasks are executed at the same pipeline stage.

In another aspect, there is provided a processor comprising a plurality of physical processing cores configured to process tasks, a static scheduling unit configured to generate a plurality of task groups that each comprise at least one task, and to allocate the plurality of task groups to virtual cores by dividing or combining the tasks included in the plurality of task groups based on execution time estimates of the plurality of task groups, and a dynamic scheduling unit configured to map the virtual cores to the plurality of physical cores.

The dynamic scheduling unit may identify a task group with a highest execution time estimate that is allocated to a first physical core and map part of the task group with the highest execution time to a second physical core that is allocated a task group with a lowest execution time estimate.

The processor may further comprise a task phase matching unit configured to detect a preceding task and a group of subsequent tasks that have a parallel relationship to each other, and if one of the subsequent tasks is allocated to a different physical core from the preceding task, the task phase matching unit is configured to match pipeline stages of each of the subsequent tasks such that the subsequent tasks are executed at the same pipeline stage.

Other features and aspects may be apparent from the following detailed description, the drawings, and the claims.

BRIEF DESCRIPTION OF THE DRAWINGS

FIGS. 4A through 4H are diagrams illustrating examples of the operation of the static scheduling unit.

Figure 1:
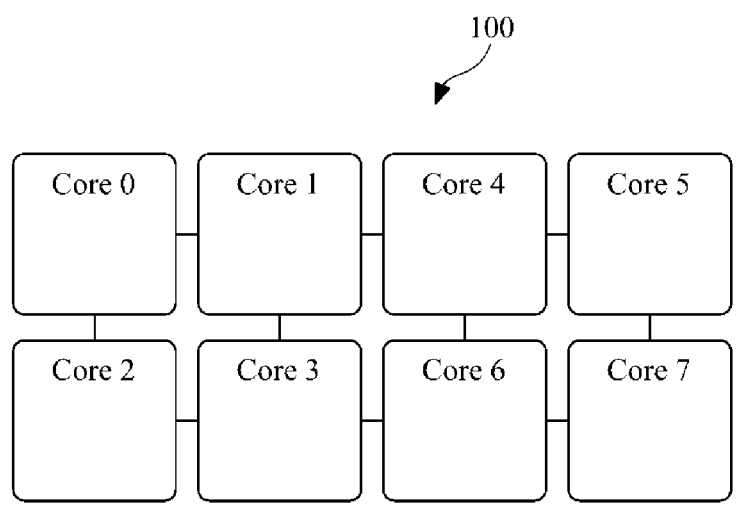
FIG. 1 is a diagram illustrating an example of a multicore device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a multicore device.

Referring to FIG. 1, multicore device 100 includes a plurality of cores. In this example, the multicore device 100 includes eight cores, but the multicore device is not limited thereto. The cores may execute multiple tasks at the same time. For example, the multicore device 100 may execute multiple tasks in parallel using the cores, which can operate independently of one another. For example, when tasks A and B have a parallel relationship therebetween or when tasks A and B are parallel, tasks A and B may be executed in parallel at the same time by, for example, cores 1 and 2. The multicore device 100 may be included in various devices, for example, a mobile terminal, a computer, a personal digital assistant (PDA), an MP3 player, and the like.

Each of the cores of the multicore device 100 may be placed in an idle state. The idle state indicates a state in which a core of the multicore device 100 is idle without executing tasks. Idle cores may lead to a waste of resources. For example, assume that task C is supposed to be executed after the execution of tasks A and B. In this example, if core 1 finishes the execution of task A but core 2 is yet to finish the execution of task B, core 1 may become idle and thus cannot begin to execute task C until core 2 finishes the execution of task B.

Figure 2:
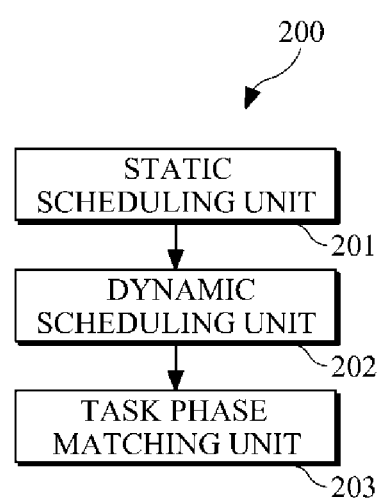
FIG. 2 is a diagram illustrating an example of a compiler.

FIG. 2 illustrates an example of a compiler.

Referring to FIG. 2, in this example the compiler 200 may includes a static scheduling unit 201 and a dynamic scheduling unit 202. The compiler 200 may also include a task phase matching unit 203. The compiler 200 may be applied to a multicore device that has a plurality of cores. For example, the compiler 200 may compile programs to reduce the waste of resources that may result from idle cores in the multicore device 100. The compiler 200 and/or its components may be included in a multicore device, such as a processor.

The static scheduling unit 201 may allocate tasks between a plurality of virtual cores based on the amount of resources used by each of the tasks such that the waste of resources that results from an uneven distribution of the tasks may be reduced. For example, the static scheduling unit 201 may generate a plurality of task groups and each task group may include at least one task. The static scheduling unit 201 may regenerate the task groups by dividing or combining the tasks included in the task groups until the task groups become similar in terms of execution time, and may allocate the task groups to the virtual cores. As another example, the static scheduling unit 201 may regenerate the task groups such that each task group has an estimated execution time below a threshold time value.

The dynamic scheduling unit 202 may allocate the tasks to a plurality of physical cores such that the physical cores may increase the use of available resources when executing the tasks. For example, the dynamic scheduling unit 202 may allocate the tasks to the physical cores by mapping the virtual cores to the physical cores.

As an example, if a task group with a highest execution time estimate is initially allocated to a first physical core and a task group with a lowest execution time estimate is initially allocated to a second physical core, which is connected to the first physical core, the dynamic scheduling unit 202 may reallocate part of the task group with the highest execution time estimate to the second physical core.

Figure 3:
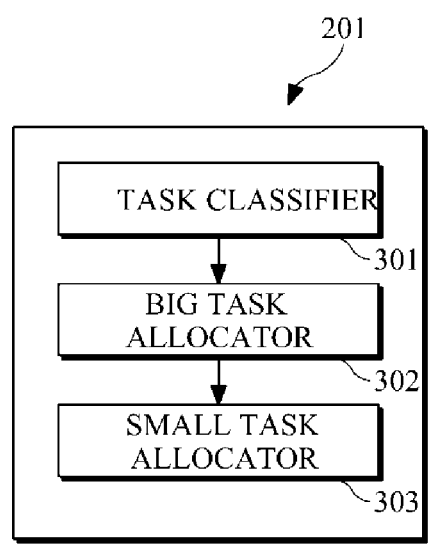
FIG. 3 is a diagram illustrating an example of a static scheduling unit.

The task phase matching unit 203 may match the pipeline stages of the tasks such that the cores of the multicore device 100 may be prevented from becoming idle due to discrepancies in execution time between the pipeline stages of tasks allocated to different physical cores. For example, the task phase matching unit 203 may detect a preceding task and subsequent tasks that have a parallel relationship therebetween. For example, the task phase matching unit 203 may detect the parallel relationship from a data flow graph. In response to at least one of the subsequent tasks being allocated to a different physical core from the preceding task, the pipeline stages of the subsequent tasks may be matched such that the subsequent tasks are executed in the same pipeline stage. FIG. 3 illustrates an example of a static scheduling unit.

Referring to FIG. 3, static scheduling unit 201 may include a task classifier 301, a big task allocator 302, and a small task allocator 303. FIGS. 4A through 4H illustrate examples of the operation of the static scheduling unit 201.

The structure and operation of the static scheduling unit 201 are described with reference to FIGS. 3 and 4A through 4H.

The task classifier 301 may receive a plurality of tasks. For example, referring to FIG. 4A, the task classifier 301 may receive tasks A through J.

The task classifier 301 may calculate the execution time estimates of the tasks. The term 'execution time estimate' indicates an estimate of the time used for a core or a group of cores to execute a task or a task group that includes a plurality of tasks. For example, the execution time estimates of the tasks may be calculated based on profile data that is obtained by executing test files. For example, referring to FIG. 4A, the numeric values next to tasks A through J indicate the execution time estimates of tasks A through J.

The task classifier 301 may classify the tasks into big and small tasks based on their respective execution time estimates. For example, the task classifier 301 may classify tasks that have execution time estimates that are greater than a threshold value as big tasks, and may classify other tasks as small tasks. For example, referring to FIG. 4A, if the threshold value is 20, tasks A through F may be classified as big tasks, and tasks H through J may be classified as small tasks.

In response to the tasks being classified into big and small tasks, the big task allocator 302 allocates big tasks to virtual cores. For example, the big task allocator 302 may allocate task groups that each have at least one big task to the virtual cores. For example, the big task allocator 302 may continue to divide or combine the tasks included in the task groups until the task groups become approximately the same or the same in terms of execution time. This is further described with reference to FIGS. 4B through 4G.

Figure 4A:
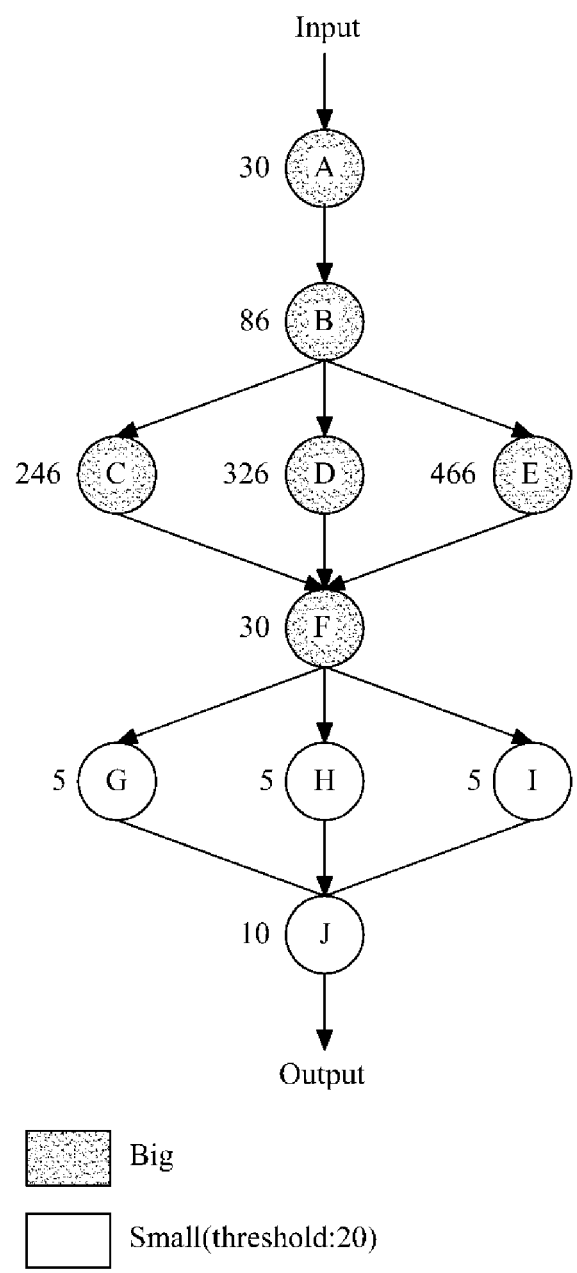
Figure 4B:
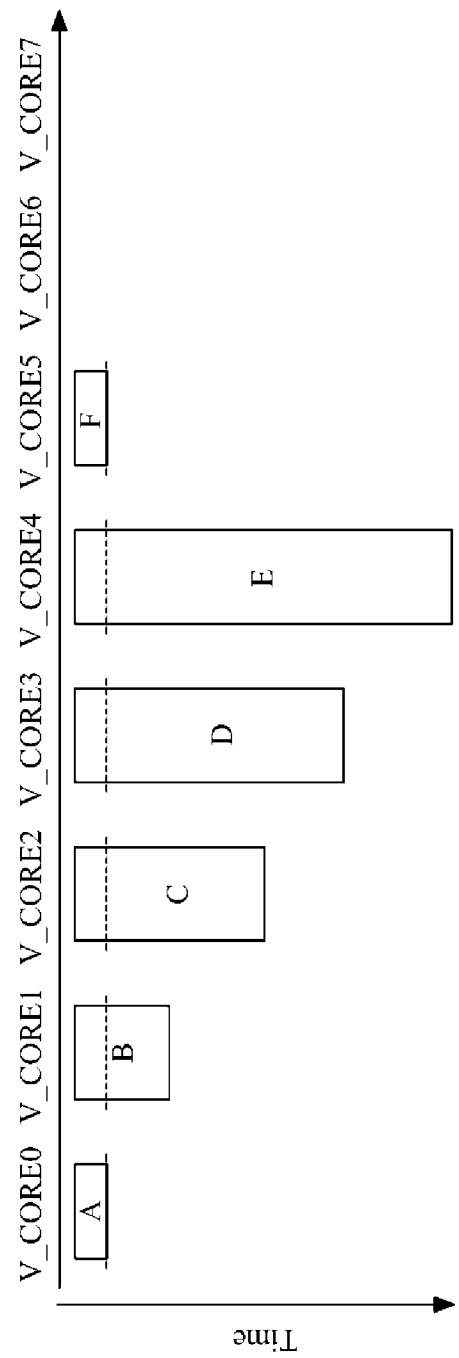

Referring to FIG. 4B, the big task allocator 302 may group tasks into one or more task groups, and allocates the task groups to the virtual cores. Individual tasks may be interpreted as task groups including only one task. For example, referring to FIG. 4B, task A may also be referred to as task group A.

Figure 4C:
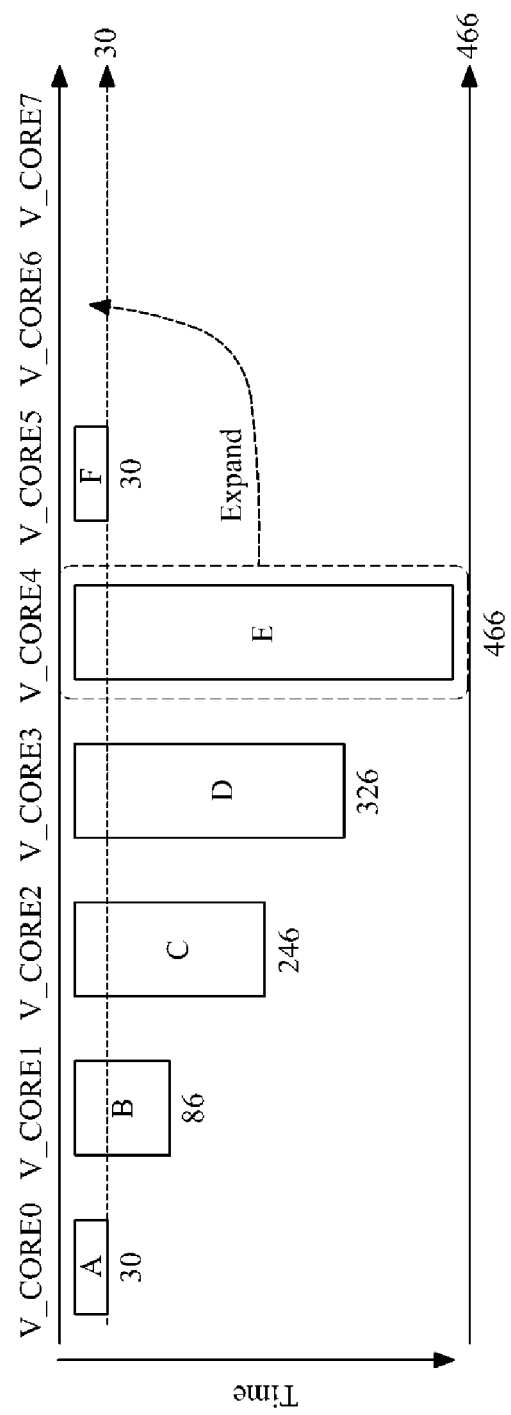

Referring to FIG. 4C, the big task allocator 302 may calculate the execution time estimates of task groups A through F. For example, the big task allocator 302 may calculate the execution time estimates of task groups A through F in consideration of the number of virtual cores allocated to each of task groups A through F. In this example, zeroth through fifth virtual cores V_CORE0 through V_CORE5 are allocated task groups A through F, respectively, the big task allocator 302 may calculate the time required for a single virtual core to execute each of task groups A through F.

In response to the execution time estimates of task groups A through F being obtained, the big task allocator 302 may search task groups A through F for a MAX task group that has a highest execution time estimate and a MIN task group that has a lowest execution time estimate. For example, task group E may be identified as the MAX task group, and task group A or F may be identified as the MIN task group.

In response to the MAX and MIN task groups being found, the big task allocator 302 may determine whether the difference between the execution time estimates of the MAX and MIN task groups is less than a threshold value of, for example, 120.

In this example, the execution time estimate of the MAX task group is 466 and the execution time estimate of the MIN task group is 20. Therefore, the difference between the execution time estimates of the MAX and MIN task groups is 446 and is not less than the threshold value of 120. For example, when the difference between the execution time of the MAX task group and the MIN task group is above a threshold value, the big task allocator may increase the number of virtual cores allocated to the MAX task group and/or may combine the MIN task group with another task group and allocate the combined task group to a virtual core.

For example, the big task allocator 302 may increase the number of virtual cores allocated to the MAX task group. For example, the big task allocator 302 may divide the MAX task group, i.e., task group E, between the fourth core V_CORE4 and a sixth core V_CORE6, as shown in FIG. 4C.

Figure 4D:
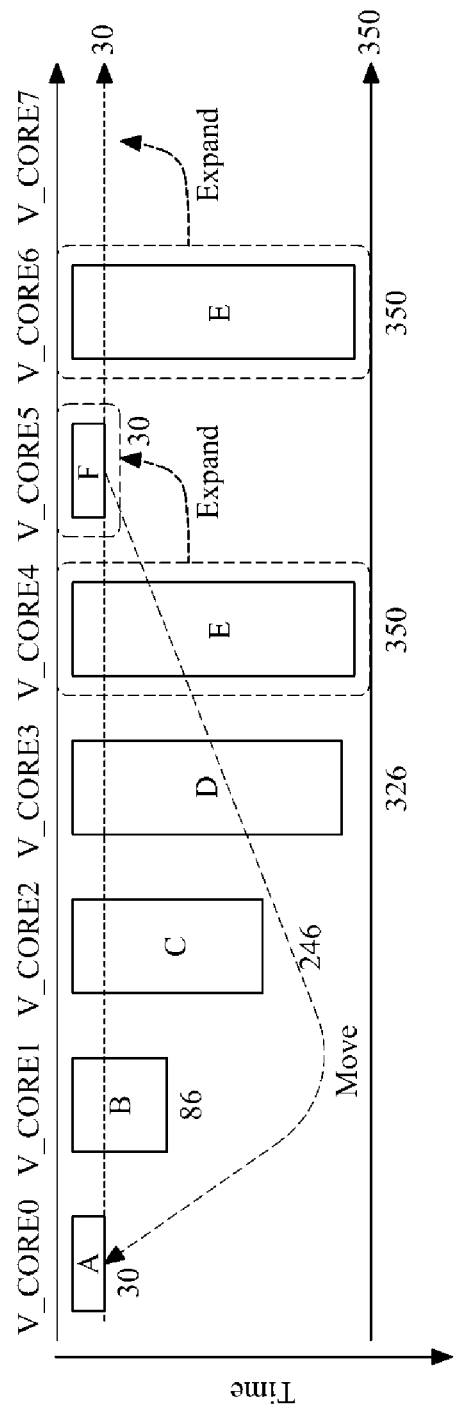

Referring to FIG. 4C, the big task allocator 302 calculates the execution time estimates of task groups A through F again, for example, in consideration of the number of virtual cores allocated to each of task groups A through F. Because task group E is allocated to two virtual cores, as shown in FIGS. 4C and 4D, the execution time estimate of task group E is reduced from 466 to 350.

The big task allocator 302 may search task groups A through F for a new MAX task group and a new MIN task group. For example, task group E may be identified as the new MAX task group, and task group A or F may be identified as the new MIN task group.

The big task allocator 302 may calculate the difference between the execution time estimates of the new MAX and MIN task groups, and determine whether the result of the calculation is less than the threshold value of 120. In this example, the difference between the execution time estimates of the new MAX and MIN task groups is 320 and is still not less than the threshold value of 120.

Therefore, the big task allocator 302 may divide the new MAX group, i.e., task group E, between the fourth, fifth, and sixth virtual cores V_CORE4, V_CORE5, V_CORE6 and a seventh virtual core V_CORE7. The number of virtual cores that a task group is allocated to may be increased, for example, from one to two, from two to three, from two to four, from four to six, and from six to eight, and the like. For example, the number of virtual cores that a task group is allocated to may be increased according to the specification of the architecture of a multicore device. Thus, the big task allocator 302 may allocate task group E to four virtual cores as shown in FIG. 4D.

If, as the result of increasing the number of virtual cores that a MAX task group is allocated to, a virtual core already occupied by another task group is newly allocated the MAX task group, the big task allocator 302 may combine the corresponding task group and a MIN task group into a single task group, and may allocate the single task group to a virtual core, for example, the virtual core originally allocated to the MIN task group. For example, referring to FIG. 4D, task group F, which is a MIN task group, and task group A may be combined into a single task group, i.e., task group AF, and task group AF may be allocated to the zeroth virtual core V_CORE0, as shown in FIG. 4E.

Figure 4E:
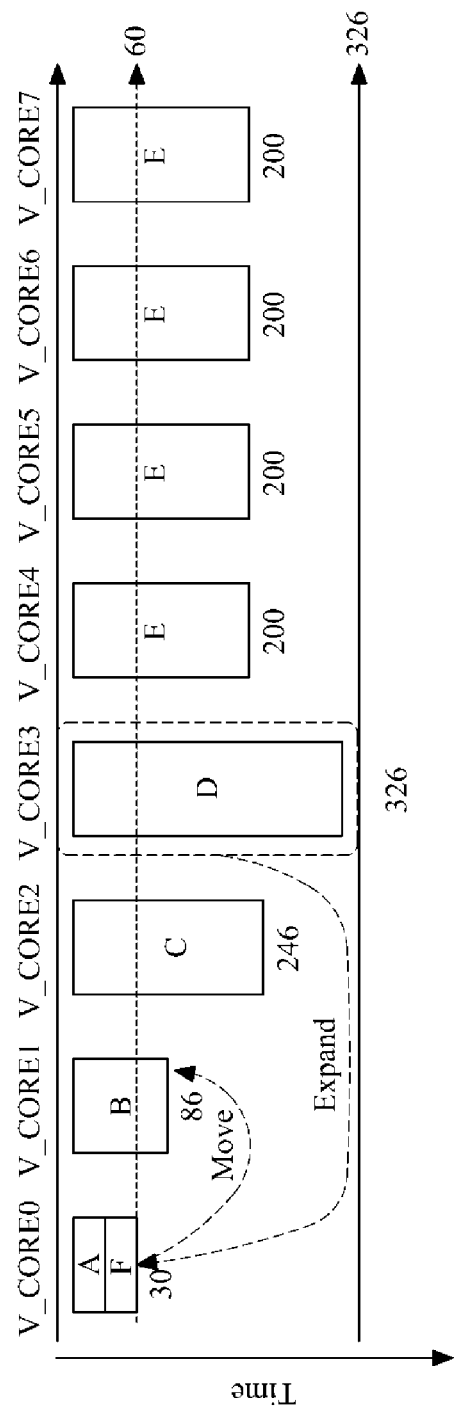

Referring to FIG. 4E, the big task allocator 302 may calculate the execution time estimates of task groups AF, B, C, D and E. In this example, because task group E is allocated between four virtual cores, the execution time estimate of task group E is reduced from 350 to 200.

The big task allocator 302 may search for another MAX and MIN task groups. For example, task group D may be identified as another new MAX task group, and task group AF may be identified as another new MIN task group. The big task allocator 302 determines whether the difference between the execution time estimates of task groups D and AF is less than the threshold value of 120.

For purpose of example, if the difference between the execution time estimates of task groups D and AF is 266 and is still not less than the threshold value of 120, the big task allocator 302 may perform a reallocation of task group D. For example, the big task allocator 302 may additionally allocate task group D to a virtual core. In this example, because all the zeroth through seventh cores V_CORE0 through V_CORE7 are already occupied by the respective task groups, the big task allocator 302 may combine task group AF and a task group (i.e., task group B) with a second lowest execution time estimate into a single task group, thereby generating a task group BAF. In response, as shown in FIG. 4F the big task allocator 302 may allocate task group D between the zeroth and third cores V_CORE0 and V_CORE3.

Referring to FIG. 4F, because the difference between the execution time estimates of task group C, which is a MAX task group, and task group BAF, which is a MIN task group, is 100 and is less than the threshold value of 120, the operation of the big task allocator 302 may complete.

Figures 4G, 4H:
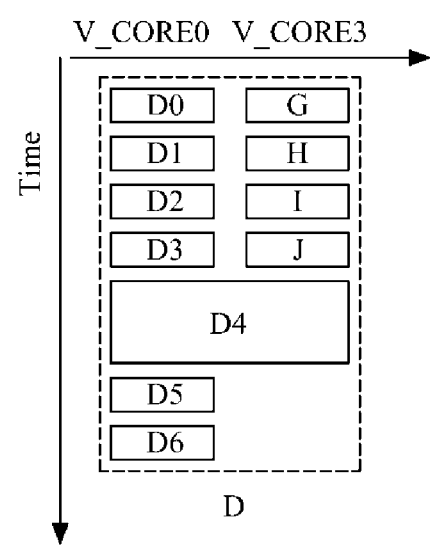

FIG. 4G is a table illustrating an example of how tasks A through E are allocated between the zeroth through seventh virtual cores V_CORE0 through V_CORE7 as the result of the operation of the big task allocator 302. Referring to FIGS. 4F and 4G, task group BAF including tasks A, B, and F is allocated to the first virtual core V_CORE1, task group C including task C is allocated to the second virtual core V_CORE2, task group D including task D is allocated between the zeroth and third virtual cores V_CORE0 and V_CORE3, and task group E including task E is allocated between the fourth, fifth, sixth, and seventh virtual cores V_CORE4, V_CORE5, V_CORE6, and V_CORE7.

The small task allocator 303 may allocate small tasks, i.e., tasks G, H, I, and J, between the zeroth through seventh virtual cores V_CORE0 through V_CORE7. The small task allocator 303 may detect a main task of the small tasks, and may allocate the small tasks to the virtual core to which the detected main task is allocated. For example, task D may include a plurality of small tasks.

For example, referring to FIG. 4H, if task D is the main task of small tasks G, H, I, and J, the small task allocator 303 may detect a cyclic code D4 and non-cyclic codes D0 through D3, D5, and D6 from task D. Cyclic codes are portions of a task such as loops that may be processed simultaneously by multiple cores. For example, if task group D is allocated between the zeroth and third virtual cores V_CORE0 and V_CORE3, the cyclic code D4 may be processed by both the zeroth and third virtual cores V_CORE0 and V_CORE3, whereas the non-cyclic codes D0 through D3, D5, and D6 may be processed solely by the zeroth virtual core V_CORE0. That is, when the non-cyclic codes D0 through D3, D5, and D6 are executed, the third virtual core V_CORE3 may be placed in the idle state. The small task allocator 303 may allocate small tasks, i.e., tasks G, H, I, and J, to the third virtual core V_CORE3, thereby utilizing available resources.

Figure 5:
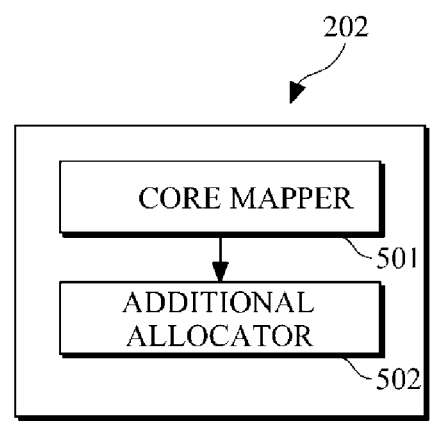
FIG. 5 is a diagram illustrating an example of a dynamic scheduling unit.

FIG. 5 illustrates an example of a dynamic scheduling unit. Referring to FIG. 5, dynamic scheduling unit 202 includes a core mapper 501 and an additional allocator 502.

Figure 6A:
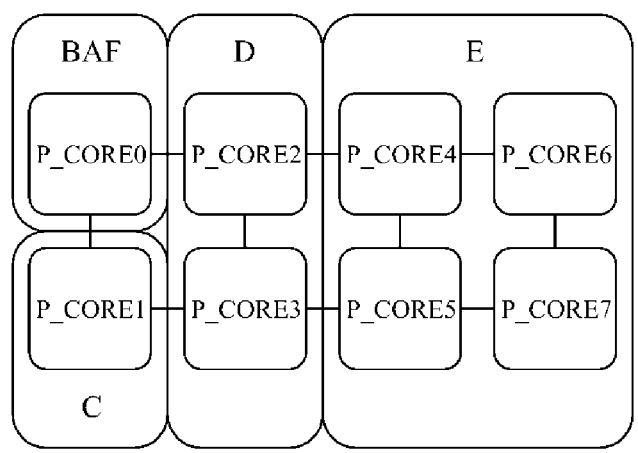
FIGS. 6A through 6C are diagrams illustrating an example of the operation of the dynamic scheduling unit.
Figure 6B:
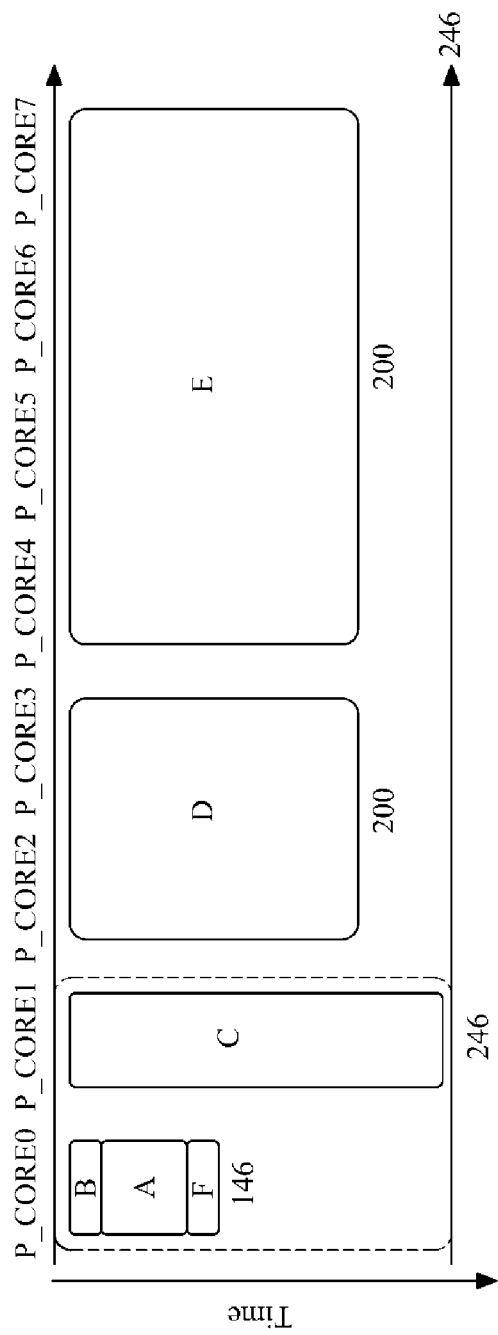
Figure 6C:
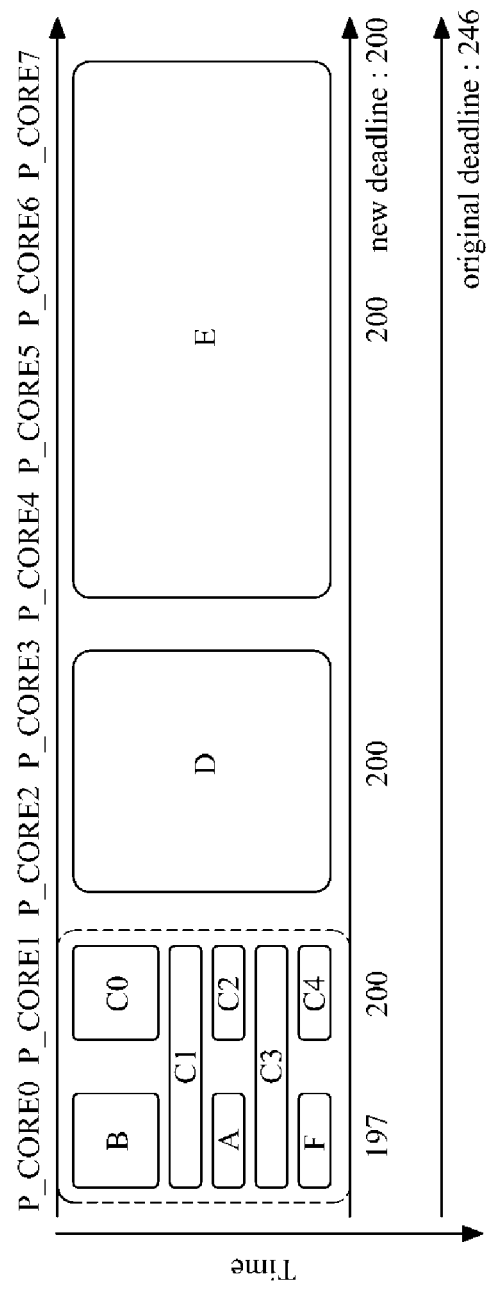

FIGS. 6A through 6C illustrate examples of the operation of the dynamic scheduling unit 202.

The core mapper 501 may allocate task groups to physical cores by mapping virtual cores to the physical cores. For example, the core mapper 501 may map a first virtual core to a first physical core to which a MAX task group is allocated, and may map a second virtual core to a second physical core which is connected to the first physical core and to which a MIN task group is allocated.

For example, referring to FIG. 4F, the core mapper 501 may map the second virtual core V_CORE2, to which a MAX task group, i.e., task group C is allocated, to a particular physical core, and may map the zeroth virtual core V_CORE0, to which a MIN task group, i.e., task group BAF is allocated, to a physical core physically connected to the particular physical core.

For example, referring to FIG. 6A, the core mapper 501 may allocate task groups BAF and C to zeroth and first physical cores P_CORE0 and P_CORE1, respectively. Because the zeroth and first physical cores P_CORE0 and P_CORE1 are connected physically, task groups BAF and C may share the zeroth and first physical cores P_CORE0 and P_CORE1 during runtime.

When the allocation of task groups to physical cores by the core mapper 501 is complete, the additional allocator 502 may reallocate part of a MAX task group to a physical core to which a MIN task group is allocated. For example, the additional allocator 502 may detect one or more resource-constrained portions from the MAX task group, and may reallocate the detected resource-constrained portion to the physical core to which the MIN task group is allocated.

Referring to FIG. 6C, when task groups BAF and C are allocated to the zeroth and first physical cores P_CORE0 and P_CORE1, respectively, by the core mapper 501, as shown in FIG. 6B, the additional allocator 502 may search task group C for one or more resource-constrained portions. Resource-constrained portions are parts of a task whose execution time is determined according to the amount of resources allocated thereto, for example, a loop whose execution efficiency increases according to the amount of resources allocated thereto. In this example, the additional allocator 502 may detect loops C1 and C3 from task group C, and may allocate the loops C1 and C3 to the zeroth physical core P_CORE0 such that each of the loops C1 and C2 may be executed between tasks allocated to the zeroth physical core P_CORE0.

When the allocation of part of the MAX task group to the physical core to which the MIN task group is allocated is complete, the additional allocator 502 may calculate the execution time estimate of the task group allocated to each physical core. For example, referring to FIGS. 6A and 6C, as a result of the allocation of part of task group C to the zeroth physical core P_CORE0, the execution time estimate of the task group allocated to the zeroth physical core P_CORE0 is increased from 146 to 197. On the other hand, due to the allocation of part of task group C to the zeroth physical core P_CORE0, the execution time estimate of the task group allocated to the first physical core P_CORE1 is reduced from 246 to 200. Thus, the general deadline is reduced from 246 to 200.

The additional allocator 502 may determine whether a variation in the deadline falls within a predetermined range. For example, if the allocation of the MAX task group between adjacent physical cores fails within the predetermined range, the additional allocator 502 may not perform a reallocation of the MAX task group.

Figure 7:
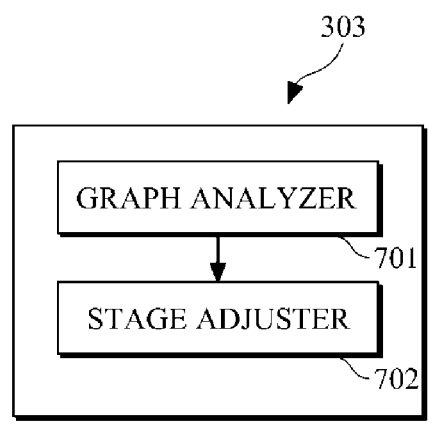
FIG. 7 is a diagram illustrating an example of a task phase matching unit.

FIG. 7 illustrates an example of a task phase matching unit. Referring to FIG. 7, task phase matching unit 303 includes a graph analyzer 701 and a stage adjuster 702. FIGS. 8A through 8E illustrate examples of the operation of the task phase matching unit 303. The structure and operation of the task phase matching unit 303 is further described with reference to FIGS. 7 and 8A through 8E.

The graph analyzer 701 may perform phase alignment of a data flow graph. For example, the graph analyzer 701 may analyze the data flow graph. The graph analyzer may determine the order of task groups and detect one or more parallel relationships between the task groups based on the results of the analysis. For example, referring to FIG. 8A, the graph analyzer 701 may detect tasks B and C as having a parallel relationship therebetween and their preceding task is task A.

The stage adjuster 702 may determine whether one or more of the tasks having a parallel relationship are allocated to a different physical core from its preceding task. For example, referring to FIG. 8B, task C, which has a parallel relationship with task B, is allocated to a different physical core from its preceding task, i.e., task A.

Figure 8A:
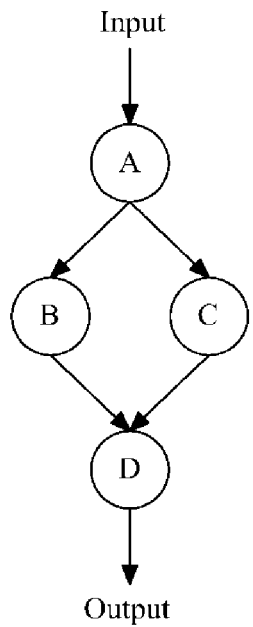
FIGS. 8A through 8E are diagrams illustrating examples of the operation of the task phase matching unit.
Figure 8B:
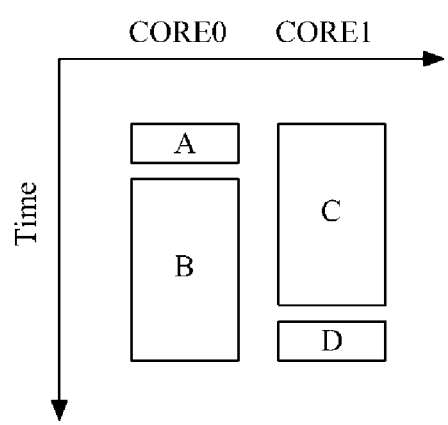
Figure 8C:
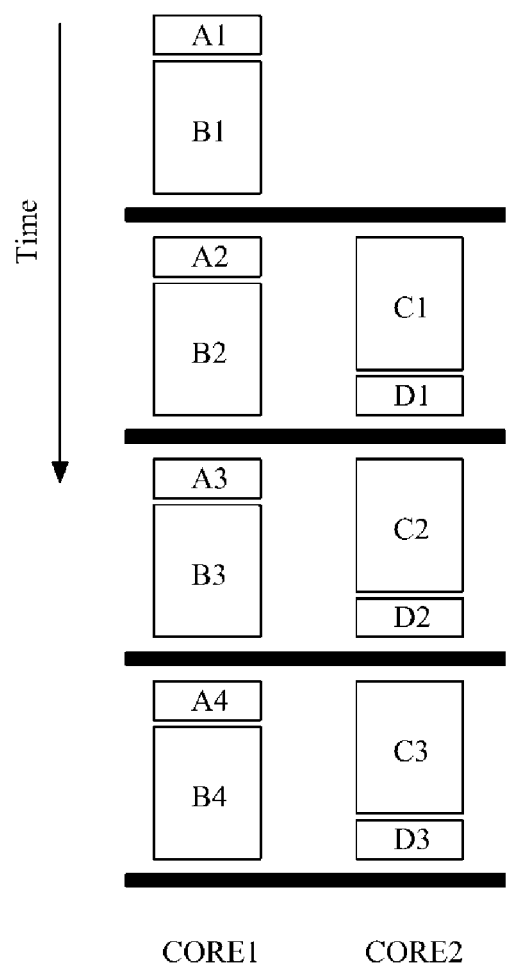
Figure 8D:
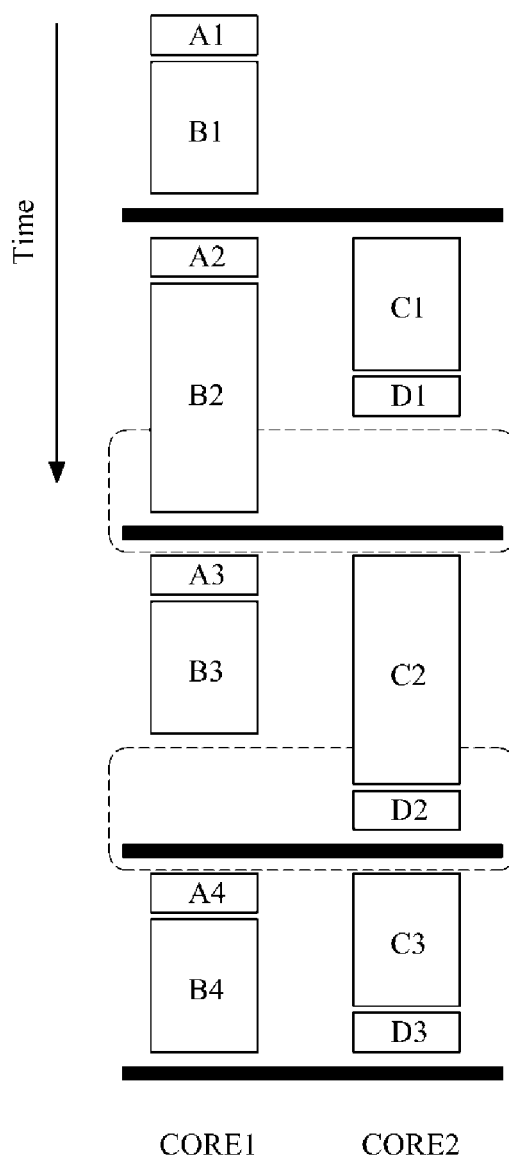

If the execution time of the pipeline stage of a task is uniform regardless of the type of input data, as shown in FIG. 8B, neither core 1 nor 2 may become idle, as shown in FIG. 8C. However, the execution time of the pipeline stage of a task may vary according to the type of input data. Referring to FIG. 8D, for example, task B may have a prolonged second stage based on the type of input data. In this example, a physical core to which task B is not allocated, i.e., core 2, may become idle.

Figure 8E:
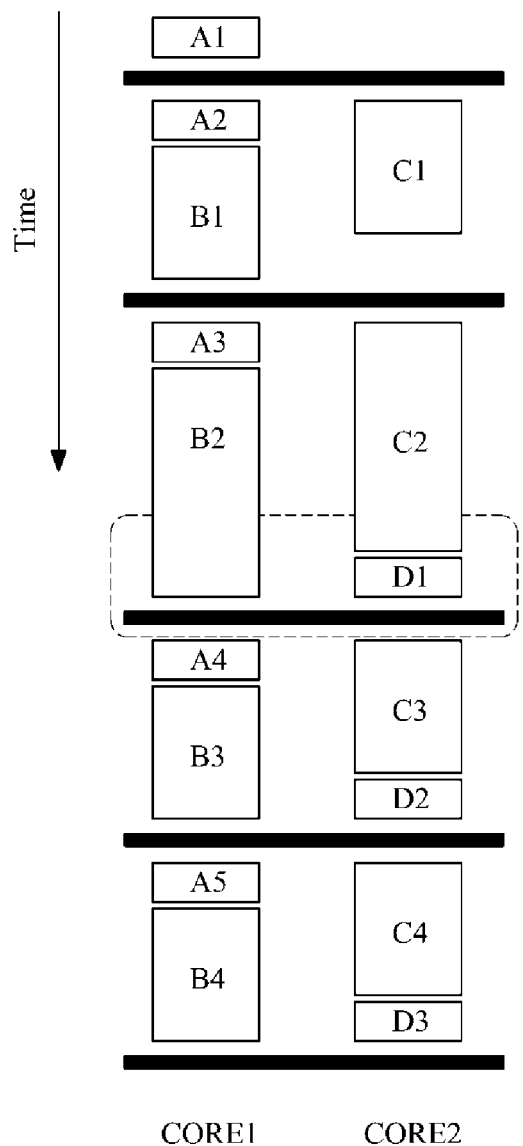

Referring to FIG. 8E, if one or more of the tasks having a parallel relationship therebetween are allocated to a different physical core from its preceding task, the stage adjuster 702 may match the pipeline stages of the tasks such that they can be executed at the same pipeline stage. For example, in consideration that the execution times of tasks having a parallel relationship therebetween tend to share similar patterns of change according to the type of input data, the stage adjuster 702 may delay the pipeline stage of task B, which is allocated to the same physical core as its preceding task (i.e., task A) such that the pipeline stage of task B is process at the same time as the pipeline stage of task C.

Figure 9:
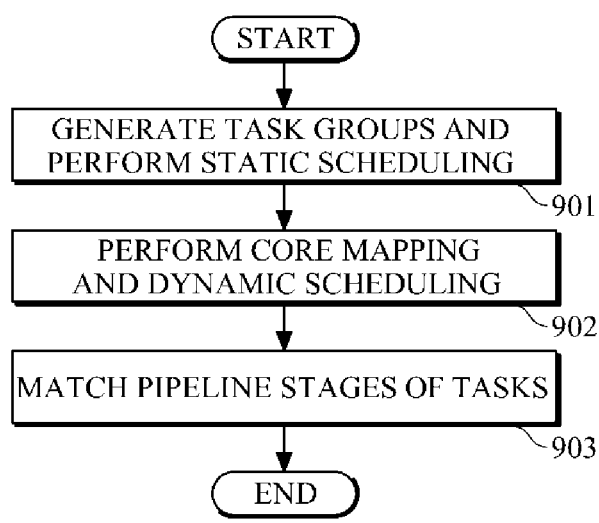
FIG. 9 is a flowchart illustrating an example of a compiling method.

FIG. 9 illustrates an example of a compiling method.

Referring to FIGS. 2 and 9, the compiler 200 may perform static scheduling in units of task groups. For example, in 901, the static scheduling unit 201 generates a plurality of task groups that each include at least one task, and allocates the task groups to virtual cores by dividing or combining the tasks included in the task groups according to the execution time estimates of the task groups. Examples of generating task groups and performing task scheduling are provided with reference to FIGS. 3 and 4A-FH.

The compiler 200 maps the virtual cores to physical cores and performs dynamic scheduling, in 902. For example, referring to FIGS. 5 and 6A through 6C, the dynamic scheduling unit 202 may allocate the task groups to the physical cores by mapping the virtual cores to the physical cores. If a MAX task group with a highest execution time estimate is allocated to a first physical core and a MIN task group with a lowest execution time estimate is allocated to a second physical core physically connected to the first physical core, the dynamic scheduling unit 202 may reallocate part of the MAX task group to the second physical core.

The compiler 200 matches the pipeline stages of tasks in the task groups, in 903. For example, referring to FIGS. 7 and 8A through 8E, the task phase matching unit 303 may detect a group of tasks having a parallel relationship therebetween and their preceding task from a data flow graph. If one of the tasks having a parallel relationship therebetween is allocated to a different physical core from its preceding task, the task phase matching unit 303 may match the pipeline stages of the tasks having a parallel relationship therebetween such that they are executed in the same pipeline stage.

As described above, it is possible to prevent waste of resources in a multicore device by minimizing idle cores in the multicore device and maximizing the use of available resources in the multicore device.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A compiling apparatus comprising:
a processor comprising
a static scheduling unit configured to
generate task groups comprising respective tasks, and comprising a first task group and a second task group, and
allocate the task groups to virtual cores by dividing or combining the tasks included in the task groups based on execution time estimates of the task groups, and
a dynamic scheduling unit configured to
map the virtual cores to physical cores comprising a physical core and a second physical core, and
reallocate a part of the first task group with a highest execution time estimate and allocated to the first physical core, to the second physical core connected to the first physical core and to which the second task group with a lowest execution time estimate is allocated.

2. The compiling apparatus of claim 1, wherein the static scheduling unit is configured to:
calculate the execution time estimates of the task groups based on a number of virtual cores to execute each of the task groups; and regenerate the of task groups by dividing or combining the tasks included in the task groups based on the results of the calculation.

3. The compiling apparatus of claim 1, wherein the static scheduling unit is configured to:
detect the first task group with the highest execution time estimate and the second task group with the lowest execution time estimate; and
regenerate the task groups by dividing or combining the tasks included in the task groups until a difference between the highest execution time estimate and the lowest execution time estimate is less than a predetermined threshold value.

4. The compiling apparatus of claim 3, wherein, if the difference is not less than the threshold value, the static scheduling unit is configured to increase a number of virtual cores that are allocated to the first task group with the highest execution time estimate.

5. The compiling apparatus of claim 3, wherein, if the difference is not less than the threshold value, the static scheduling unit is configured to merge the second task group with the lowest execution time estimate with another task group among the task groups.

6. The compiling apparatus of claim 1, wherein the static scheduling unit comprises:
a task classifier configured to classify the tasks into big tasks and small tasks based on execution time estimates of the tasks, the big tasks having execution time estimates that are greater than a predefined threshold value, and the small tasks having execution time estimates that are not greater that the predefined threshold value;
a big task allocator configured to
generate the task groups,
calculate the execution time estimates of the task groups based on a number of virtual cores to be allocated to each of the task groups,
reallocate the task groups by dividing or combining the big tasks included in the task groups based on the execution time estimates of the task groups, and
allocate the task groups to the virtual cores; and
a small task allocator configured to
detect a main task of the small tasks from the big tasks, and
allocate the small tasks to a virtual core, among the virtual cores, to which the detected main task is allocated so that the small tasks are executed when non-cyclic codes of the detected main task are executed.

7. The compiling apparatus of claim 1, wherein the dynamic scheduling unit is configured to:
map a first virtual core, among the virtual cores, to which the first task group with the highest execution time estimate is allocated, to the first physical core; and
map a second virtual core, among the virtual cores, to which second the task group with the lowest execution time estimate is allocated, to the second physical core, connected to the first physical core.

8. The compiling apparatus of claim 1, wherein the dynamic scheduling unit is configured to:
detect a resource-restrained portion from the first task group with the highest execution time estimate; and
reallocate the detected resource-restrained portion to the second physical core based on an execution time estimate of each of the physical cores.

9. The compiling apparatus of claim 1, further comprising:
a task phase matching unit configured to
detect a preceding task and a group of subsequent tasks having a parallel relationship therebetween from a data flow graph, and
if one of the subsequent tasks is allocated to a different physical core from the preceding task, among the physical cores, match pipeline stages of the subsequent tasks such that the subsequent tasks are executed at a same pipeline stage.

10. The compiling apparatus of claim 9, wherein the task phase matching unit is configured to:
delay the pipeline stage of one of the subsequent tasks that is allocated to a same physical core as the preceding task, among the physical cores, such that the subsequent tasks are executed at the same pipeline stage.

11. A compiling method comprising:
generating task groups comprising respective tasks, and comprising a first task group and a second task group;
allocating the task groups to virtual cores by dividing or combining the tasks included in the task groups based on execution time estimates of the task groups;
mapping the virtual cores to physical cores comprising a first physical core and a second physical core; and
reallocating a part of the first task group with a highest execution time estimate and allocated to the first physical core, to the second physical core to which the second task group with a lowest execution time estimate is allocated.

12. The compiling method of claim 11, further comprising:
detecting a preceding task and a group of subsequent tasks that have a parallel relationship therebetween from a data flow graph; and
in response to one of the subsequent tasks being allocated to a different physical core from the preceding task, among the physical cores, matching pipeline stages of the subsequent tasks such that the subsequent tasks are executed at a same pipeline stage.

13. A processor comprising:
physical cores configured to process tasks, and comprising a first physical core and a second physical core;
a static scheduling unit configured to
generate task groups comprising tasks, and comprising a first task group and a second task group, and
allocate the task groups to virtual cores by dividing or combining the tasks included in the task groups based on execution time estimates of the task groups; and
a dynamic scheduling unit configured to
map the virtual cores to the physical cores, and
reallocate a part of the first task group with a highest execution time estimate and allocated to the first physical core, to the second physical core connected to the first physical core and to which the second task group with a lowest execution time estimate is allocated.

14. The processor of claim 13, wherein the dynamic scheduling unit is configured to:
identify the first task group with the highest execution time estimate and allocated to the first physical core.

15. The processor of claim 13 further comprising:
a task phase matching unit configured to
detect a preceding task and a group of subsequent tasks that have a parallel relationship to each other; and
if one of the subsequent tasks is allocated to a different physical core from the preceding task, among the physical cores, match pipeline stages of each of the subsequent tasks such that the subsequent tasks are executed at a same pipeline stage.

* * * * *